No. 623,390. Patented Apr. 18, 1899.
J. B. WILSON.
TOOTH FOR AGRICULTURAL IMPLEMENTS.
(Application filed July 9, 1898.)
(No Model.)
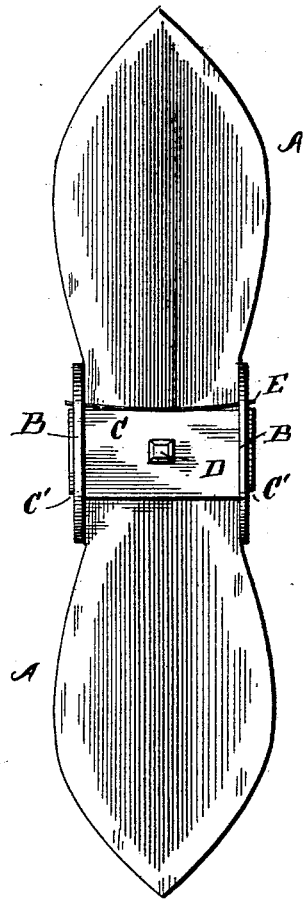
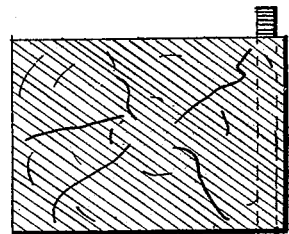
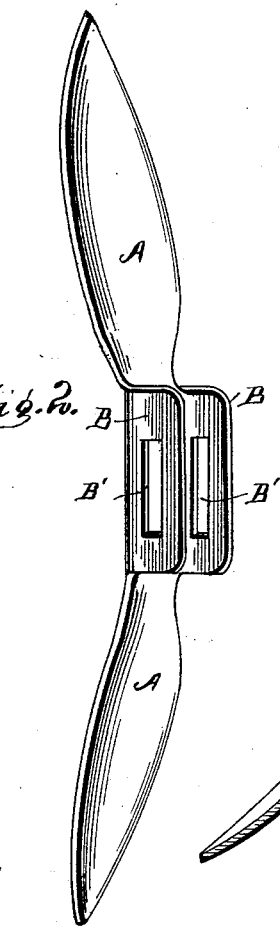
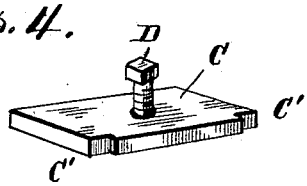
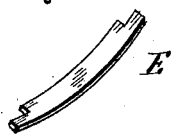
WITNESSES
Chas. K. Davies.
M. H. Bartlett
INVENTOR
J. B. Wilson
By C. E. Wood
Attorney
THE NORRIS PETERS CO., PHOTO-LITHO., WASHINGTON, D. C.

UNITED STATES PATENT OFFICE.

JEROME B. WILSON, OF LANSING, MICHIGAN.

TOOTH FOR AGRICULTURAL IMPLEMENTS.

SPECIFICATION forming part of Letters Patent No. 623,390, dated April 18, 1899.

Application filed July 9, 1898. Serial No. 685,494. (No model.)

*To all whom it may concern:*

Be it known that I, JEROME B. WILSON, residing at Lansing, in the State of Michigan, have invented certain new and useful Improvements in Teeth for Agricultural Implements, of which the following is a specification, reference being had therein to the accompanying drawings.

This invention relates to improvements in reversible detachable teeth for harrows, cultivators, and seeding-machines.

The object of the invention is to produce working teeth which shall be cheaply constructed, of great strength, and which may be firmly attached to permanent teeth of harrows, cultivators, and similar agricultural implements.

Figure 1 is a rear elevation of the improved tooth and its attaching mechanism. Fig. 2 is a rear perspective of the reversible tooth. Fig. 3 is a side elevation and section of so much of a spring-toothed harrow as is necessary to show the relation of the improved tooth thereto. Fig. 4 is a perspective of the clamp-bar and screw. Fig. 5 is a detail perspective of the clamp-bar spring, and Fig. 6 a perspective of the binding-screw.

The patent to Gardiner, No. 198,372, of December 18, 1877, shows a detachable and reversible tooth for seeding-machines and cultivators on which the present invention is an improvement.

My reversible tooth A is made of a single piece of metal, preferably steel, having both ends sharpened and of suitable size and shape for a cultivator or harrow tooth. The central portion of the tooth has two wings B B, which wings are turned back at about right angles to the body of the tooth A. These wings have vertical slots B' B', which slots extend in a direction about parallel with the central body portion of the tooth A and at a distance from said body a little greater than the thickness of the fixed tooth of the implement to which the reversible tooth is to be applied. A clamp-bar C, of a length slightly greater than the distance between the wings B B and a little narrower than the length of slots B' B', has its corners cut away, as indicated at C' C'. The length of the wider portion of this clamp-bar is such that said wide portion will lie between the wings B B when the bar is entered, as in Figs. 1 and 4.

The bar C has a screw-threaded hole about at its center, and a screw D may be entered into this hole. Screw D has a head to which a wrench may be applied. Screw D is applied to the bar C after the bar has been entered into slots B' B'.

A light spring E, having its ends notched to enter slots B' above the bar C, bears against said bar, so as to press the notched edges of said bar down into the lower part of the slots B', so that said bar C cannot then move endwise in said slots. (See Fig. 1.)

The tooth and its attachments constructed as described may be applied to the tooth K of a harrow or cultivator, the tooth A lying in front of said cultivator-tooth and the clamp-bar C lying behind it. The screw D may be tightened onto the tooth K, so as to hold tooth A at the desired height.

Tooth A may be easily removed from tooth K, reversed, and adjusted to any desired height on said tooth K.

Tooth A may be cast, drop-forged, or made by other approved process. As they are in one piece they are durable and cheap. The flat bars C, screws D, and springs E are also very simple of construction, and the parts can be conveniently packed for shipment or assembled for use.

What I claim is—

1. The combination with the permanent tooth of a harrow or like implement, of the double-ended reversible tooth-point described, consisting of a plate with integral side wings turned back from its central position, each of said side wings having an elongated opening extending vertically, a broad clamp-bar passing through both of said slots and behind the harrow-tooth proper, and a set-screw passing through said clamp-bar and directly engaging the harrow-tooth, substantially as described.

2. The combination with the tooth having integral slotted side wings extending back from its central portion, of the notched clamp-bar embraced in the slots in said wings, and the spring extending into the slots in the wings and bearing on said clamp-bar, all substantially as described.

In testimony whereof I affix my signature in presence of two witnesses.

JEROME B. WILSON.

Witnesses:
FRANK E. TALMADGE,
BLANCHE B. BOOSINGER.